Nov. 15, 1949

O. C. WALLEY 2,488,455

CARBON PILE ELECTRIC REGULATOR

Filed Aug. 17, 1948

WITNESSES:
Robert C. Baird
Leon M. Garman

INVENTOR
Omar C. Walley.
BY
James N. Ely
ATTORNEY

Patented Nov. 15, 1949

2,488,455

UNITED STATES PATENT OFFICE 2,488,455

CARBON PILE ELECTRIC REGULATOR

Omar C. Walley, Lima, Ohio, assignor to Westinghouse Electric Corporation, East Pittsburgh, Pa., a corporation of Pennsylvania Application August 17, 1948, Serial No. 44,598

6 Claims. (Cl. 201—51)

This invention relates to pile regulators and, in particular, to pile regulators of the lightweight aviation type.

Recently, carbon pile regulators have been developed which are especially suitable for use in airplanes, trucks, buses and the like in that they are compact, lightweight and are efficient in operation. Pile regulators of this type are disclosed and claimed in Patent 2,268,718, issued January 6, 1942, to F. Newton, which regulators utilize an armature assembly embodying a special spring and cooperating abutment therefor for controlling the pressure applied to the stack of carbon discs.

The manufacture of the special spring assembly for the regulator of the Newton patent provides a particularly difficult problem in that a large number of variables occur. In practice, a number of the variables have been eliminated or compensated with some degree of success. However, the variable exemplified by the angle of the spring which affects the spring load curve of the assembly has been difficult to control. This is evident when it is considered that in commercial practice the star form of spring utilized has six rays or fingers and that each assembly is provided with at least four such springs, thereby requiring the manual forming of at least twenty-four spring rays or fingers to the required angle.

From the foregoing, it is apparent that a small error in the angle of each ray or finger of the spring assembly adds up to a large error in the completed assembly. As the spring fingers have a predetermined angle with respect to the angle of the beveled abutment in a normal operating position to reduce mechanical friction therebetween while obtaining a minimum amount of slippage therebetween, it is seen that the additive errors of the angle of the rays of the spring make it quite difficult to obtain the necessary load-deflection curve.

An object of this invention is the provision in a pile regulator of a simplified armature and spring assembly for working against a beveled abutment for controlling the pressure applied to the pile.

Another object of this invention is to provide in a pile regulator having an armature and spring assembly therefor for utilizing a spring that is normally flat when unrestrained and to provide for maintaining the spring in a restrained position in the assembly whereby it tends to assume a predetermined angle relative to its flat unrestrained state.

A further object of this invention is to provide, in a pile regulator having a spring assembly for compressing the pile and in which a spring of star form is employed which is normally flat when unrestrained, for maintaining the spring restrained at a predetermined angle with respect to a beveled abutment for applying pressure to the pile.

Other objects of this invention will become aparent from the following description, when taken in conjunction with the accompanying drawing, in which Figure 1 is a view in side elevation and partly in section of a regulator embodying the teachings of this invention;

Figure 1:
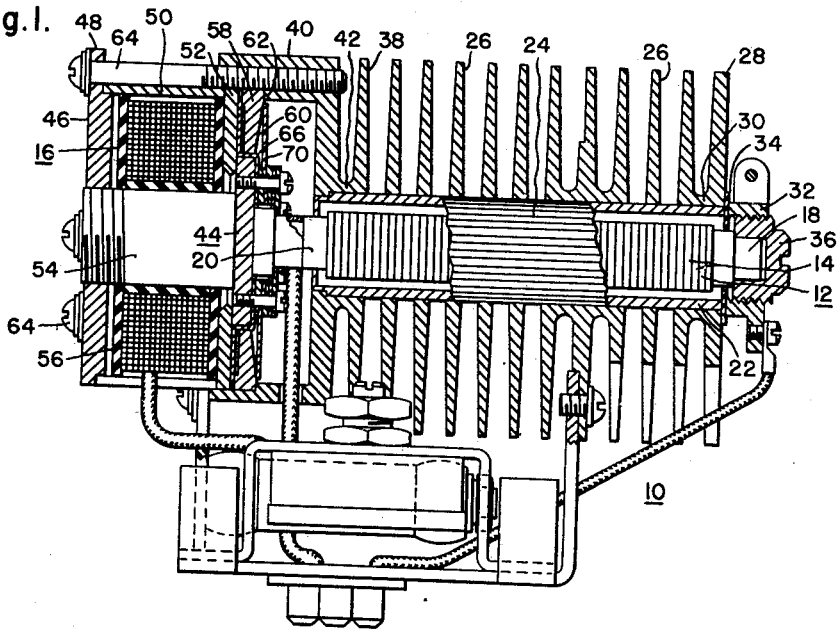

Referring to the drawing and in particular to Fig. 1 thereof, this invention is illustrated by reference to a pile regulator 10 formed of a stack 12 of discs 14 of resistance material such as carbon and an electromagnet assembly 16 disposed to control the pressure on the stack 12.

In the embodiment illustrated in Fig. 1, the stack 12 is disposed between a relatively fixed pressure plate 18 and a movable pressure plate 20 being encased in a metallic tubular housing 22. The housing 22 is provided with an outer surface 24 which is roughened as by knurling, fluting or otherwise forming ribs or grooves thereon to aid in securing a plurality of cooling fins 26 thereon. The cooling fins 26 are preferably of aluminum and are disposed about the housing 22 in spaced relation lengthwise of the housing 22 for dissipating heat which is developed in the stack during an operation of the regulator.

As a general rule, the cooling fins 26 are independently mounted one from the other depending upon their interlocking relation with the surface of the housing 22 for maintaining them in operative position on the housing. However, as illustrated, the terminal fin 28 at the end of the stack adjacent the fixed pressure plate 18 is formed as an integral unit with the adjacent fin 26, a common hub 30 being formed therebetween for strengthening the support of the fins on the housing. This is done in order to facilitate mounting an end plate 32 to the terminal fin 28 by any suitable means (not shown), a washer 34 of insulation being disposed between the terminal plate 32 and the terminal fin 28. An adjustable nut 36 is disposed in threaded engagement with the plate 32 for receiving the pressure plate 18 and for initial adjustment of the pressure on the stack 12.

At the opposite end of the stack, the terminal fin 38 is formed simultaneously with a section 40 of a sectionalized housing for the electromagnet 16. Thus the section 40 and the terminal fin 38 are formed with a common hub 42 therebetween, the hub being securely interlocked with the roughened surface of the housing 22 to provide a strong support for the section 40 of the sectionalized housing of the electromagnet 16. The section 40 is preferably of a cup-shape form whereby it will encompass the armature assembly 44 of the electromagnet 16.

As illustrated, the electromagnet 16 is of usual construction having an iron-core magnetic housing formed of a base plate 46 with lugs 48 disposed in spaced relation thereabout, a side wall member 50 and end pole pieces 52 with an adjustable core member 54. The energizing winding 56 of the electromagnet is disposed within the magnetic housing about the core member 54 being insulated from the magnetic housing and the core member in any suitable manner.

The armature assembly 44 is disposed to cooperate with an abutment member 58 provided with a sloped surface 60 which constitutes mutually inclined surfaces thereon for controlling the pressure applied to the stack 12. As illustrated, the abutment member 58 comprises a circular disc disposed upon the electromagnet and held in position thereon by means of a ledge 62 carried by and within the section 40 of the sectionalized housing near its outer edge when the magnet housing of the electromagnet 16 is secured in position with respect to the section 40 by means of spaced bolts 64. As disclosed in Patent No. 2,408,188, issued September 24, 1946, to B. O. Austin, a diaphragm 66 of copper or the like is carried by the armature assembly 44 for effecting damping during the operation of the electromagnet.

Figure 2:
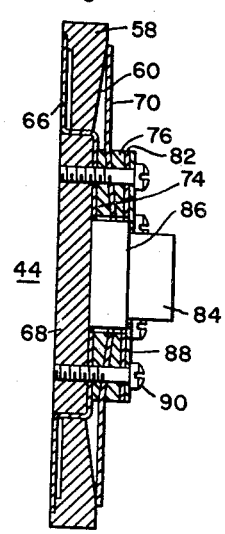
Fig. 2 is a view in section and greatly enlarged of the armature and spring assembly for the regulator of Fig. 1.
Figure 3:
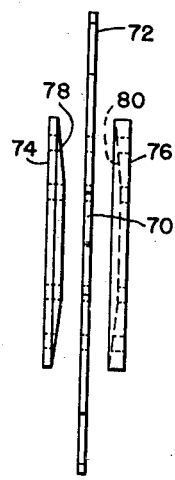
Fig. 3 is an exploded view of the components of the spring assembly of Fig. 2.
Figure 4:
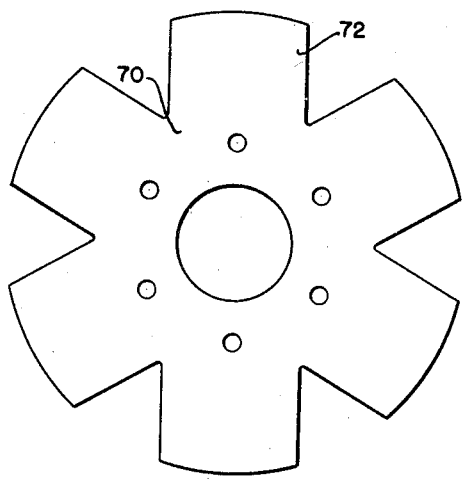
Fig. 4 is a plan view of the spring of star form utilized in the spring assembly.

Referring to Figs. 2 and 3, the details of the armature assembly 44 are more clearly shown. Thus the armature 68 is illustrated disposed centrally of the abutment member 58 and as carrying a spring member 70 and the components for assembling the spring 70 and the armature 68 as a unit. The spring 70 is of any suitable metal, being preferably of a single thickness and of star form as shown in Fig. 4, with the rays or fingers 72 extending outwardly therefrom, the spring 70 being normally flat when unrestrained.

In order to mount the spring 70 in a predetermined manner with respect to the abutment 58 and the armature 68, a pair of washer members 74 and 76 are disposed in aligned relation with respect to the armature 68, the adjacent surfaces of the washers 74 and 76 being coined or formed with inclined or beveled surfaces at a predetermined angle to form cooperating sloped surfaces which are complementary one to the other. Thus the washer 74 is formed with a coined convex surface 78 and the washer 76 is formed with a coined concave surface 80, the convex and concave surfaces 78 and 80, respectively, each being formed to the same predetermined angle or slope. Adjacent the flat surface of the washer 76 is a spacer plate 82 disposed to facilitate the application of pressure to the washers 74 and 76 when secured as described hereinafter. Centrally disposed of the washers 74 and 76 and the plate 82 is a ceramic bushing 84 which functions as a heat dam to prevent the direct passage of heat from the stack 12 to the armature assembly 44. The bushing 84 is provided with a shoulder 86 thereabout to be engaged by a retaining ring 88 disposed adjacent the plate 82. The entire assembly is disposed to be secured as an integral unit with the spring 70 tightly held between the washers 74 and 76 by means of a plurality of bolts 90 disposed in spaced relation about the washer and extending through the components.

As illustrated in Fig. 1, the bushing 84 is cylindrical in shape being disposed to receive the end of the movable pressure plate 20 so that when the armature assembly 44 is disposed to be encompassed by the section 40 of the sectionalized housing and the electromagnet housing is assembled, the spring 70 functions to compress the stack 12. When the components of the armature assembly 44 are secured by means of the spaced bolts 90, the spring 70 is bent and assumes the angle of the complementary inclined or sloped surfaces 78 and 80 of the washers 74 and 76, respectively. The rays 72 of the spring 70 are, therefore, held at an angle to the abutment member 58 when assembled therewith for cooperating with the oppositely sloped surface 60 thereof to determine the load deflection curve for the electromagnet. The normal angle of the rays 72 when the spring 70 is held between the washers 74 and 76 is not apparent from the showing made in Figs. 1 and 2, since such showing is made for a predetermined energization of the winding 56 of the electromagnet. Normally, and for normal operation of the regulator, the angle of the ray 72 with respect to the abutment will be greater than that shown in Figs. 1 and 2 and where the winding 56 is deenergized, the rays 70 will approach an extension of the angle formed by the slope of the cooperating surfaces 78 and 80 of the washers 74 and 76.

Although reference has been made hereinbefore with respect to the sectionalized housing and fin structure of the regulator, such structure forms no part of this invention but is more fully described and claimed in the copending application of J. D. Miner, Jr., et al., Serial No. 44,597, filed simultaneously herewith. Likewise, no claim is made herein with respect to the ceramic bushing 84 forming the heat dam as employed in the particular armature assembly 44 illustrated as such structure forms a part of the inventive subject matter of the copending application of B. O. Austin, Serial No. 44,776, filed simultaneously herewith.

The regulator of this invention is efficient in operation, it being apparent that the pull of the electromagnet on the armature 68 is in opposition to the force of the spring 70 for controlling the pressure applied to the stack 12. It is readily manufactured in that the variables are maintained at a minimum, a single spring being utilized in the assembly in opposition to the pull of the electromagnet. This construction facilitates a more accurate and uniform spring assembly while at the same time providing for a great reduction in the number of parts which determine the load-deflection curve for the electromagnet. As is apparent, a considerable reduction in time for assembling the regulator and a reduction of the assembly operations is obtained.

I claim as my invention:

1. In a pile regulator having a stack of discs of resistance material and an electromagnet disposed for operation to control the pressure applied to the stack, the combination comprising, an abutment member having an inclined surface disposed upon the electromagnet, an armature member for the electromagnet, a member having a concave surface, another member having a convex surface, the concave member and convex member being disposed to be secured in aligned relation to the armature member with their concave and convex surfaces adjacent and complementary to each other, the concave and convex members having their adjacent complementary concave and convex surfaces inclined in the opposite direction to that of the inclined surface of the abutment member, a spring member that is normally flat when unrestrained disposed between the complementary inclined surfaces of the concave and convex members with an end of the spring member extending beyond the concave and convex members, and means for tightly securing the concave and convex members with the spring member therebetween to the armature member whereby the end of the spring member extending beyond the concave and convex members tends to assume the angle of the complementary inclined surfaces of the concave and convex members to seat against the inclined surface of the abutment member at a predetermined angle thereto to exert pressure between the abutment member and the stack.

2. A pile regulator comprising, in combination, a stack of discs of resistance material, an electromagnet and armature therefor disposed at one end of the stack, an abutment member having an inclined surface disposed upon the electromagnet, a member having a concave surface, another member having a convex surface, the slope of the concave and convex surfaces being at a predetermined angle whereby one is completentary to the other, the concave member and convex member being disposed to be secured in aligned relation to the armature between the armature and the one end of the stack with their complementary surfaces adjacent to each other, the concave and convex members having their adjacent complementary concave and convex surfaces inclined in a direction opposite to that of the inclined surface of the abutment member, a spring member that is normally flat when unrestrained disposed between the complementary inclined surfaces of the concave and convex members with an end of the spring member extending beyond the concave and convex members, and means for tightly securing the concave and convex members with the spring member therebetween to the armature member to bend the spring member to the angle of the complementary inclined surfaces of the concave and convex members whereby the end of the spring seats against the inclined surface of the abutment member at a predetermined angle thereto and provides a biasing force to compress the stack.

3. In a pile regulator having a stack of discs of resistance material and an electromagnet disposed for operation to control the pressure applied to the stack, the combination comprising, an abutment member having mutually inclined surfaces disposed upon the electromagnet, an armature member for the electromagnet centrally positioned with respect to the abutment member, a pair of washer members carried in aligned relation by the armature member, the washer members having their adjacent surfaces inclined in the opposite direction from that of the inclined surfaces of the abutment member, a spring member that is normally flat when unrestrained disposed between the inclined surfaces of the washer members with the ends thereof extending beyond the washer members, and means for tightly securing the washer members with the spring member therebetween to the armature member whereby the ends of the spring member extending beyond the washer members tend to assume the angle of the inclined surfaces of the washer members to seat against the inclined surface of the abutment member to exert pressure between the abutment member and the stack.

4. In a pile regulator having a stack of discs of resistance material and an electromagnet disposed for operation to control the pressure applied to the stack, the combination comprising, an abutment member having mutually inclined surfaces disposed upon the electromagnet, an armature member for the electromagnet centrally positioned with respect to the abutment member, a pair of washer members carried in aligned relation by the armature member, the washer members having their adjacent surfaces inclined at a predetermined angle in the opposite direction from that of the inclined surfaces of the abutment member, and a spring member of star form that is normally flat when unrestrained disposed between the inclined surfaces of the washer members with the rays of the star spring extending beyond the washer members, and means for tightly securing the washer members with the star spring clamped therebetween to the armature member to bend the spring member to the angle of the inclined surfaces of the washer members whereby the rays of the star spring seat against the mutually inclined surfaces of the abutment member at an angle thereto to provide a biasing force to compress the stack.

5. In a pile regulator having a stack of discs of resistance material and an electromagnet disposed for operation to control the pressure applied to the stack, the combination comprising, an abutment member of circular shape having a surface thereof inclined towards the center thereof at a predetermined angle, the abutment member being disposed upon the electromagnet, an armature member for the electromagnet centrally positioned with respect to the abutment member, a pair of washer members disposed in aligned relation to the armature member, one of the washer members having the surface adjacent the other washer concave, the other of the washer members having its adjacent surface convex, the slope of the concave and convex surfaces being at the same predetermined angle whereby one is complementary to the other, a spring member of star form that is normally flat when unrestrained disposed between the adjacent complementary sloped surfaces of the washer members with the rays of the star spring extending beyond the washer members, and means for tightly securing the washer members with the star spring clamped therebetween to the armature member to bend the spring member to the angle of the slope of the complementary surfaces whereby the rays of the star spring seat against the mutually inclined surfaces of the abutment member at an angle thereto to provide a biasing force to compress the stack.

6. In a pile regulator having a stack of discs of resistance material and an electromagnet disposed for operation to control the pressure applied to the stack, the combination comprising, an abutment member having an inclined surface disposed upon the electromagnet, an armature member for the electromagnet, a member having a concave surface, another member having a convex surface, the concave member and convex member being disposed to be secured in aligned relation to the armature member with their concave and convex surfaces adjacent and complementary to each other, the concave and convex members having their adjacent complementary surfaces inclined in the opposite direction to that of the inclined surface of the abutment member, a spring member that is normally flat when unrestrained disposed between the complementary inclined surfaces of the concave and convex members, the spring member having a plurality of spaced fingers disposed with the ends thereof extending beyond the concave and convex members, and means for drawing the concave and convex members together with the spring member therebetween to bend the spring member to the angle of the complementary inclined surfaces of the concave and convex members whereby the ends of the spaced fingers of the spring member extend outwardly therefrom to seat the spaced fingers against the inclined surface of the abutment member at a predetermined angle thereto to exert pressure between the abutment member and the stack.

OMAR C. WALLEY.

REFERENCES CITED

The following references are of record in the file of this patent:

UNITED STATES PATENTS

| Number | Name | Date |
| --- | --- | --- |
| 2,400,136 | Rady | May 14, 1946 |
| 2,408,188 | Austin | Sept. 24, 1946 |